United States Patent [19]

Pori

[11] 3,886,314

[45] May 27, 1975

[54] NO HANDS VOICE INSTRUCTION FOR EEG TELEMETERING SYSTEM

[75] Inventor: John R. Pori, Novato, Calif.

[73] Assignee: Parallel Data Systems, San Francisco, Calif.

[22] Filed: Sept. 20, 1973

[21] Appl. No.: 399,241

[52] U.S. Cl. .............................. 179/2 DP; 178/58 R

[51] Int. Cl. ............................................ H04h 11/06

[58] Field of Search .......... 179/1 C, 2 A, 2 C, 2 DP, 179/6 R; 178/58 R, 59

[56] References Cited

UNITED STATES PATENTS

| | | | |
|---|---|---|---|
| 3,426,151 | 2/1969 | Tygart | 179/2 DP |
| 3,465,103 | 9/1969 | Lynch | 179/15 FD |
| 3,691,295 | 9/1972 | Fisk | 178/58 R |
| 3,730,993 | 5/1973 | Moriyasu | 178/59 |
| 3,775,561 | 11/1973 | Guckel | 178/58 R |
| 3,786,191 | 1/1974 | Nagasawa | 179/6 R |

*Primary Examiner*—Kathleen H. Claffy
*Assistant Examiner*—Thomas D'Amico
*Attorney, Agent, or Firm*—Flehr, Hohbach, Test, Albritton & Herbert

[57] ABSTRACT

A no hands voice instruction system for specific use in an EEG telemetering system in which the EEG signal is FM modulated on several carrier frequencies and where a voice instruction signal is transmitted from the receiving end to a loudspeaker at the transmitting end of the system. The frequency modulated data information is prevented from being reproduced by the loudspeaker by means of a nulling arrangement in which the FM data channel signal is applied to both inverting and noninverting inputs of an operational amplifier one side of which is coupled to a telephone line pair over which the voice instructions are transmitted from the receiving end of the system. The loudspeaker is connected to the output of the operational amplifier.

3 Claims, 2 Drawing Figures

NO HANDS VOICE INSTRUCTION FOR EEG TELEMETERING SYSTEM

BACKGROUND OF THE INVENTION

The present invention is directed to a telemetering system for transmitting multi-channel data over a voice quality transmission medium such as a telephone line pair and more particularly to a system in which the receiving portion of the system has the capability of giving "no hands" voice instruction to the transmitting portion of the telemetering system.

In copending application Ser. No. 211,221 filed Dec. 23, 1971, in the name of John R. Pori, entitled "Telemetering System for Multi-Channel Data" and now U.S. Pat. 3,786,190 there is disclosed a telemetering system where EEG data of eight channels is frequency modulated by eight different carrier frequencies and transmitted over a telephone line pair. Such EEG or electroencephalographic data is then studied at the remote or receiving end of the line pair by specialists in that field and the evaluation is then communicated to the transmitting facility. Such transmitting facility as explained in the above copending application will generally be located in an outlying area where the patient resides but where no specialist is resident.

In order to insure that the multi-channel data is being received and is of adequate quality for interpretation and evaluation, it is necessary to communicate with or give instructions to the resident doctor who is, for example, applying electrodes from an EEG unit to the patient's head. It is, of course, most convenient to use the same telephone line pair for this instruction as is being used for the transmission of the EEG data.

In the past, telephone type hybrid systems have been used but they are costly, are of excessive weight in the system which should be portable, and provide for limited isolation of the multi-channel data being transmitted over the system.

Another technique has been proposed in Tygart U.S. Pat. No. 3,426,150 in which a telephone hand set is used to couple the EEG device, for example, to the telephone lines and where as stated by the patent the apparatus is designed to allow the user to position his ear with respect to the telephone such that an incoming conversation on the telephone may be heard. In order to block out the data being transmitted a muting switch is provided which must be actuated. This shunts the information to ground. Such a system as disclosed in the Tygart patent is obviously inconvenient and cumbersome in use.

In yet another Tygart U.S. Pat. No. 3,426,151, the use of a band elimination filter to filter out the data channel from the voice instruction channel is suggested. This has the defect in reducing fidelity of sound and also providing for poor isolation from the data channel. In addition, the '151 Tygart patent is used for EKG information at a single carrier frequency whereas EEG information requires multiple carriers as discussed in the Pori patent.

OBJECTS AND SUMMARY OF THE INVENTION

It is, therefore, a general object of the present invention to provide an improved no hands voice instruction system for use in a telemetering system.

It is a more specific object of the invention to provide a system as above especially useful for multi-channel data.

In accordance with the above objects there is provided a telemetering system for transmitting multi-channel data over a transmission medium which is a single voice quality communications channel. The multi-channel data frequency modulates a unique carrier frequency for each data channel for providing a frequency modulated signal for transmission over the communications channel. The system includes receiving means coupled to the voice channel for demodulating the frequency modulated signal and displaying such multi-channel data for interpretation. Transmitter means couple the frequency modulated (FM) signal to the voice channel. First amplifier means couple the FM signal to the voice channel and has a gain for amplifying the signal to a predetermined level suitable for transmission over the voice channel. Operational amplifier means are provided which have an inverting input and a noninverting input. Voice instruction signals transmitted from the receiving means over the voice channel are coupled to one of the inputs. Second amplifier means couple the FM signal to the other input of the operational amplifier means and has substantially the same gain as the first amplifier means for matching the predetermined level. Loudspeaker means are coupled to the output of the operational amplifier for receiving the voice instruction signals. The inverting and noninverting inputs null out the FM signal.

DETAILED DESCRIPTION OF THE PREFERRED EMBODIMENT

Figure 1:
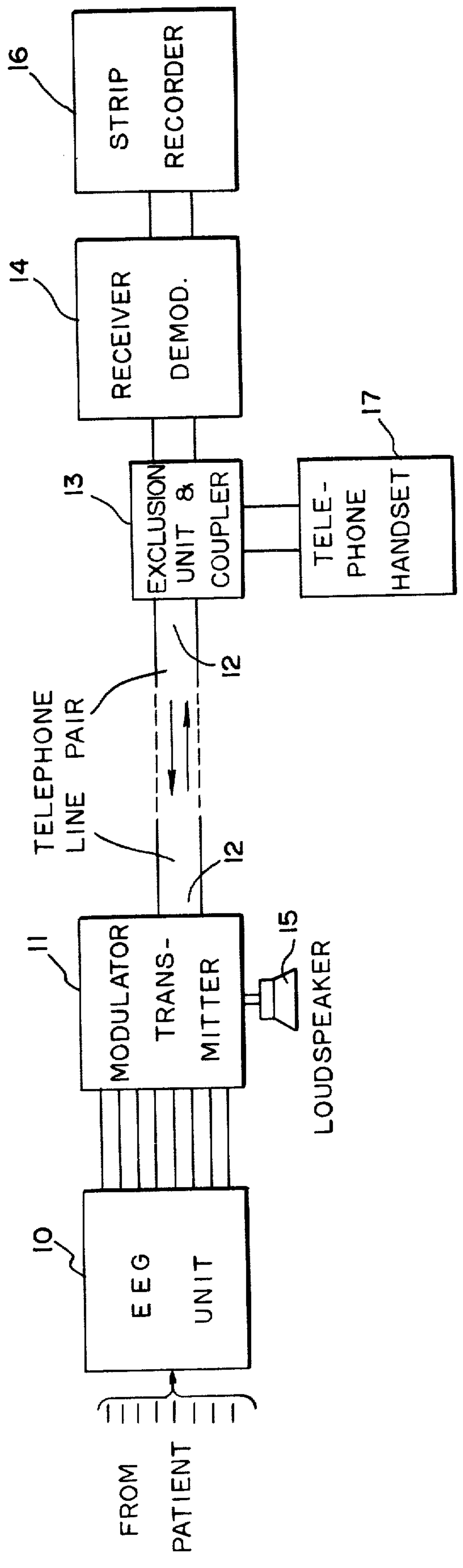
FIG. 1 is a block diagram embodying the present invention.

Referring now to FIG. 1, the transmitter portion of the present invention includes an EEG unit 10 which is adapted to receive eight output channels or more from electrodes attached to a patient. Multiple output channels of the EEG unit are coupled to a modulator-transmitter unit 11 which as taught in the above-mentioned Pori patent frequency modulates a unique carrier frequency for each data channel for providing a frequency modulated signal which is coupled to the outgoing telephone line pair indicated at 12. The modulator transmitter unit 11 also includes a physically attached loudspeaker 15. Both the modulator transmitter unit 11 and loudspeaker 15 are located in the proximity of the EEG unit 10 and, of course, the patient to which the electrodes are attached so that the person applying such electrodes can hear instructions over the loudspeaker 15.

After being transmitted over the telephone line pair 12, the frequency modulated signal passes through an exclusion unit and coupler 13, is demodulated by a receiver demodulator 14 into the original multi-channel data which is then recorded in a manner well known in the art on a strip recorder 16. This data is then visually inspected for interpretation and evaluation.

Telephone hand set 17 is coupled to exclusion unit and coupler 13. When the evaluator of the information wishes to communicate with the person or persons transmitting the, for example, EEG data, the standard exclusion switch is actuated on unit 13 and the telephone hand set 17 used for giving voice instructions. As will be described in detail below, such instructions are transmitted to speaker 15 and are to be acted upon by the user at the transmitting end of the system. During this time, of course, no data can be received by the strip recorder 16.

Details of the receiver-demodulator 14 are fully shown in the Pori patent.

It should be emphasized at this point that the present system is applicable to types of data transmission other than EEG multi-channel signals.

Figure 2:
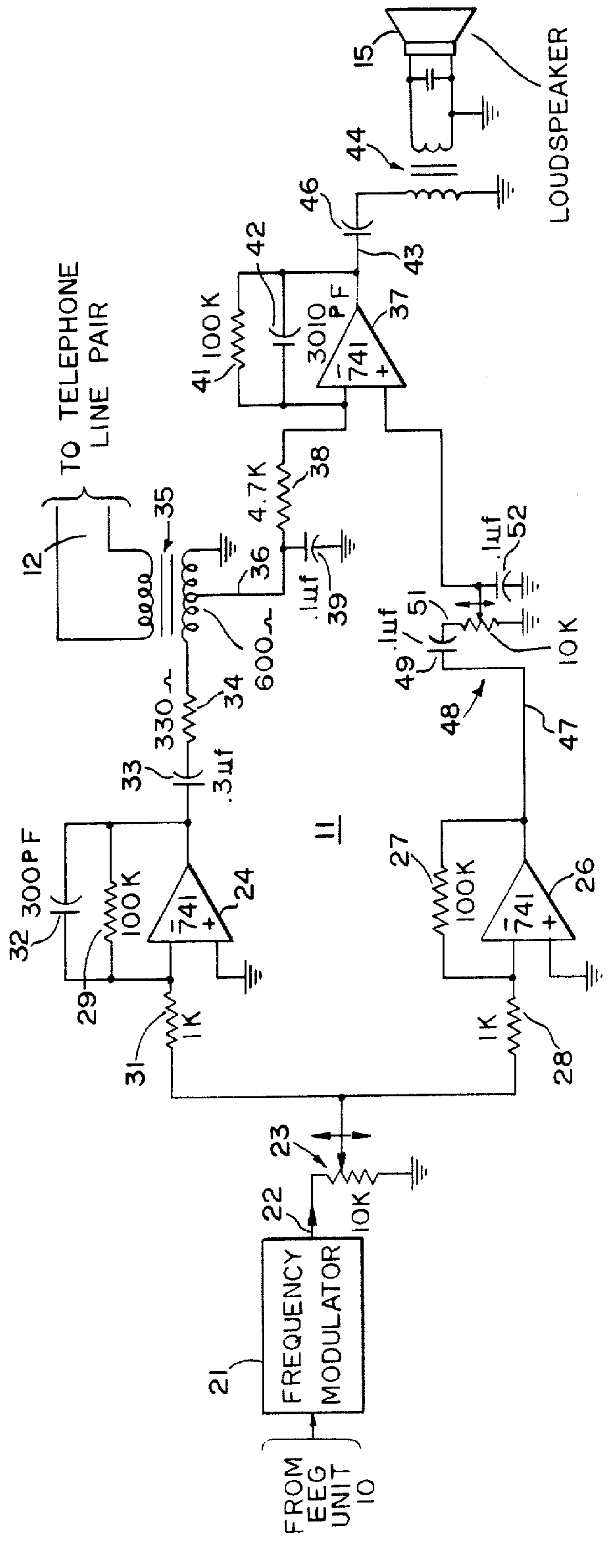
FIG. 2 is a detailed circuit schematic of a portion of FIG. 1.

FIG. 2 illustrates in greater detail the modulator-transmitter 11 of FIG. 1 and includes loudspeaker 15. The multi-channel audio data from EEG unit 10 is coupled to a frequency modulator 21 to provide on its output 22 a frequency modulated signal. The amplitude of the signal is adjusted by potentiometer 23 and is symmetrically applied to a pair of high gain amplifiers 24 and 26. Such amplifiers are of the 741 type and well known in the art. Amplifier 26 includes a shunting resistor 27 of the value marked and a series resistor 28 of the value marked. The ratio of these resistors determines the amplification of the amplifier. Similarly, amplifier 24 includes an identical shunting resistor 29 and a series resistor 31. The shunting capacitor 32 is for the purpose of wave shaping to eliminate the normally triangular wave function from an EEG unit converting it to a sinusoidal shape for application to the telephone line pair.

The output of amplifier 24 is coupled through a dc isolation capacitor 33, and resistor 34 to a 600 ohm transformer 35. The secondary of the transformer is coupled to a telephone line pair 12. The center tap indicated at 36 is connected to the inverting or minus input of an operational amplifier 37 which again is of the 741 type. Moreover, the coupling includes a low pass RC type filter which includes a series resistor 38 and a capacitor 39 connected to the ground. This prevents any frequency greater than 3 kHz from reaching operational amplifier 37. Amplifier 37 includes a shunting resistor 41 and a shunting capacitor 42. The output of operational amplifier 37 on line 43 is connected to loudspeaker 15 through an impedance matching transformer 44 and a dc isolation capacitor 46.

The output of amplifier 26 on line 47 is coupled to the plus or noninverting input of operational amplifier 37 through a filter coupling attenuator 48. The attenuator includes a series capacitor 49 coupled to an adjustable potentiometer 51 which in turn is coupled to a capacitor 52.

In operation the frequency modulated signal on line 22 is, of course, coupled to telephone line pair 12 via the first amplifier 24. This amplifier must have sufficient gain in order to provide an FM signal level clearly above the ambient noise level of the telephone line pair. In order to receive voice instruction signals from the telephone line pair 12 which have originated at the receiver portion of the system as shown in FIG. 1, the loudspeaker 15 must, of course, also be coupled to the same telephone line pair. This is accomplished through the operational amplifier 37. Thus, any FM data signal which is transmitted through the telephone pair would normally also reach loudspeaker 15.

However, in accordance with the present invention amplifier 26 also amplifies the FM signal to a level which substantially matches the level provided by amplifier 24 to be applied to the noninverting input of operational amplifier 37. Thus, the FM signal is nulled out at the output 43 of the operational amplifier to thus allow free transmission of the voice instruction signal. Adjustable potentiometer 51 provides for fine control in reaching that null point.

Thus, the present invention has provided an improved no hands voice instruction system in a telemetering system since the user of the system at the transmitting end need perform no action to receive voice instructions from the receiving end of the system.

I claim:

1. A telemetering system for transmitting multi-channel data over a transmission medium which is a single voice quality communications channel and where said multi-channel data frequency modulates a unique carrier frequency for each data channel for providing a frequency modulated signal for transmission over said communications channel said system including receiving means coupled to said voice channel for demodulating said frequency modulated signal and displaying such multi-channel data for interpretation the improvement in said system comprising: transmitter means for coupling said frequency modulated (FM) signal to said voice communications channel and including first amplifier means for coupling said FM signal to said voice channel and having a gain for amplifying such signal to a predetermined level suitable for transmission over said voice channel; operational amplifier means having an inverting input and a noninverting input; means for coupling voice instruction signals transmitted from said receiving means over said voice channel to one of said inputs; second amplifier means for coupling said FM signal to the other input of said operational amplifier means and having substantially the same gain as said first amplifier means for matching said predetermined level; and loudspeaker means coupled to the output of said operational amplifier for receiving said voice instruction signals said inverting and noninverting inputs nulling out said FM signal.

2. A system as in claim 1 including an adjustable attenuator coupled between said second amplifier and said other input.

3. A system as in claim 1 where said receiving means includes a telephone headset with exclusion key for transmitting said voice instruction signals to said loudspeaker.

* * * * *